United States Patent
Lindholm et al.

(10) Patent No.: US 10,309,066 B2
(45) Date of Patent: Jun. 4, 2019

(54) CONTROL SYSTEM FOR COLD PLANER AND APPARATUS AND METHOD THEREOF

(71) Applicant: Caterpillar Paving Products Inc., Brooklyn Park, MN (US)

(72) Inventors: Tim J. Lindholm, Blaine, MN (US); Eric S. Engelmann, Delano, MN (US); Nathan L. Mashek, Saint Michael, MN (US); Paul J. Koenen, Andover, MN (US); Lee M. Hogan, Varna, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 189 days.

(21) Appl. No.: 15/344,074

(22) Filed: Nov. 4, 2016

(65) Prior Publication Data

US 2018/0127930 A1 May 10, 2018

(51) Int. Cl.
*E01C 23/088* (2006.01)
*E01C 23/12* (2006.01)
*B65G 15/22* (2006.01)

(52) U.S. Cl.
CPC ............ *E01C 23/088* (2013.01); *B65G 15/22* (2013.01); *E01C 23/127* (2013.01); *B65G 2201/04* (2013.01); *E01C 2301/50* (2013.01)

(58) Field of Classification Search
CPC ... E01C 23/088; E01C 23/127; E01C 2301/50
See application file for complete search history.

(56) References Cited

U.S. PATENT DOCUMENTS

| | | | | |
|---|---|---|---|---|
| 4,929,121 A | * | 5/1990 | Lent | E01C 23/088 299/1.5 |
| 2013/0322964 A1 | * | 12/2013 | Buschmann | E01C 19/48 404/77 |
| 2014/0015303 A1 | * | 1/2014 | Denson | E01C 23/088 299/39.2 |
| 2018/0058214 A1 | * | 3/2018 | Berning | E01C 23/088 |

FOREIGN PATENT DOCUMENTS

CN     104074123 A     10/2014

OTHER PUBLICATIONS

English language machine translation of Long et al., Chinese Patent Publication CN104074123 A, published Oct. 1, 2014 (12 pages) (Year: 2014).*

* cited by examiner

*Primary Examiner* — David J Bagnell
*Assistant Examiner* — Michael A Goodwin
(74) *Attorney, Agent, or Firm* — Oblon, McClelland, Maier & Neustadt (57) ABSTRACT

A control system, apparatus, and method for controlling operations of a milling machine are described. Data corresponding to a ventilation mode and a conveyor delay amount set by an operator of the milling machine is stored in memory. Control of transition of operation of the milling machine from a milling mode to a standby mode is according to a first predetermined sequence of operations responsive to a first input at a control panel of the milling machine. Further, control of transition of operation of the milling machine from the standby mode to the milling mode is according to a second predetermined sequence of operations, which is in reverse order relative to the first predetermined sequence of operations, in response to the first input at the control panel.

18 Claims, 6 Drawing Sheets

CONTROL SYSTEM FOR COLD PLANER AND APPARATUS AND METHOD THEREOF

TECHNICAL FIELD

The present disclosure generally relates to cold planer machines, and more particularly relates to a system, an apparatus, and a method for controlling operations of a cold planer machine.

BACKGROUND

Pavement milling machines, such as a cold planer, may be employed to break up and remove a paved surface on a paved area, including but not limited to, a road, a bridge and a parking lot. Cold planers, which may be referred to as road mills, may include a milling system. The milling system may include a milling drum having a plurality of teeth. The milling system may draw power from an engine of the cold planer through a suitable interface to rotate the milling drum to perform milling operations on the paved surface of the paved area. The paved surface of the paved area may break up due to rotation of the milling drum against the paved surface, and the broken up material may be transferred to a dump truck via a conveyor system of the cold planer. When the dump truck is full and pulls away from the cold planer, the operator of the cold planer may manually and individually turn off various systems of the cold planer, including, but not limited to, the conveyor system and a ventilation system, while waiting for an empty dump truck to arrive to receive broken up material via the conveyor system. Similarly, once the empty dump truck has arrived and is in position to be filled, the operator may manually and individually turn on the various systems that were previously turned off.

Chinese Patent Publication No. CN 104074123 (hereinafter the CN '123 publication) describes a method for controlling a milling machine using a one-key control switch. According to the CN '123 publication, two positions of the one-key control switch respectively correspond to two working processes of controlling starting and stopping of milling work, where stopping milling work includes the following operations according to a preset sequence: regulating rotating speed of an engine of the milling machine, stopping a milling drum of the milling machine, stopping a conveyor belt of the milling machine, stopping a sprinkling pump of the milling machine, and stopping automatic leveling of the milling machine.

SUMMARY OF THE DISCLOSURE

In an aspect of the present disclosure, a cold planer is provided. The cold planer includes a frame including an operator area having a control panel with a first operator control interface and a second operator control interface. The cold planer further includes a plurality of movable engagement members connected to the frame configured to engage an underlying surface to propel the cold planer forward and backward. The cold planer further includes a milling system, supported by the frame, that includes a milling drum and a plurality of cutting tools disposed circumferentially around the milling drum. The milling system is configured to conduct a milling operation to mill a road surface. The cold planer further includes an engine configured to supply power to the plurality of movable engagement members and the milling system. The cold planer further includes a conveyor system. The conveyor system includes at least one conveyor belt and at least one drive motor configured to collect particles of road material resulting from the milling operation of the milling system, transport the particles of road material toward a discharge location of the cold planer, and discharge the particles of road material from the discharge location toward a deposit location distinct from the cold planer. The cold planer further includes a ventilation system configured to provide ventilation for byproducts of the milling operation of the milling system. The cold planer further includes a controller configured to receive, when the cold planer is in a milling mode, a control signal from the first operator control interface to initiate a first predetermined sequence of operations to transition operation of the cold planer from the milling mode to a standby mode, and control the transition of operation of the cold planer from the milling mode to the standby mode according to the first predetermined sequence of operations based on a first preset condition of the ventilation system and a second preset condition of the conveyor system input using the second operator control interface and stored in memory, in responsive to the control signal received in the milling mode. The controller is further configured to receive, when the cold planer is in the standby mode, the control signal from the first operator control interface to initiate a second predetermined sequence of operations to transition operation of the cold planer from the standby mode to the milling mode. The second predetermined sequence of operations is in reverse order relative to the first predetermined sequence of operations. The controller is further configured to control the transition of operation of the cold planer from the standby mode to the milling mode according to the second predetermined sequence of operations in response to the control signal received in the standby mode. The first preset condition of the ventilation system is whether the ventilation system is to turn off automatically as part of the first predetermined sequence of operations to transition operation of the cold planer from the milling mode to the standby mode. The second preset condition of the conveyor system is a time period, set by the operator using the second operator control interface, for which the conveyor system drives the at least one conveyor belt after initiation of the first predetermined sequence of operations to transition operation of the cold planer from the milling mode to the standby mode.

In another aspect of the present disclosure, a control system for a milling machine is provided, wherein the control system includes memory configured to store data corresponding to a ventilation mode set by an operator of the milling machine, and to store data corresponding to a conveyor delay amount set by the operator of the milling machine. The ventilation mode is indicative of whether a ventilation system of the milling machine is to turn off as part of a first predetermined sequence of operations to transition operation of the milling machine from a milling mode to a standby mode. The conveyor delay amount is a time period after which a conveyor of the milling machine stops moving after initiation of the first predetermined sequence of operations to transition operation of the milling machine from the milling mode to the standby mode. The control system further includes a controller in communication with the memory. The controller is configured to control transition of operation of the milling machine from the milling mode to the standby mode according to the first predetermined sequence of operations based on the data from the memory corresponding to the ventilation mode set by the operator and the data from the memory corresponding to the conveyor delay amount set by the operator, in response to a first input at a control panel of the milling machine when the milling machine is in the milling mode. The controller is further configured to control transition of operation of the milling machine from the standby mode to the milling mode according to a second predetermined sequence of operations in response to a second input at the control panel of the milling machine when the milling machine is in the standby mode. The second predetermined sequence of operations returns each milling machine operational state changed as part of the first predetermined sequence of operations to an operational state at the time of initiating the first predetermined sequence of operations.

In another aspect of the present disclosure, a computer-implemented method for controlling a cold planer is provided. The method includes receiving, when the cold planer is in a milling mode, a control signal from a first operator control interface to initiate a first predetermined sequence of operations to transition operation of the cold planer from the milling mode to a standby mode. The method further includes controlling the transition of operation of the cold planer from the milling mode to the standby mode according to the first predetermined sequence of operations based on a first input corresponding to a first preset condition of a ventilation system and a second input corresponding to a second preset condition of a conveyor system at a second operator control interface and stored in memory, in response to the control signal received in the milling mode.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments of the disclosed subject matter, and, together with the description, explain various embodiments of the disclosed subject matter. Further, the accompanying drawings have not necessarily been drawn to scale, and any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, structures and components may be shown in block diagram form in order to avoid obscuring the concepts of the described subject matter. Wherever possible, the same reference numbers will be used throughout the drawings to refer to the same or the like parts.

Any reference in the specification to "one embodiment" or "an embodiment" mean that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural referents unless the context clearly dictates otherwise. That is, unless clearly specified otherwise, as used herein the words "a" and "an" and the like carry the meaning of "one or more" or "at least one." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. may merely identify one of a number of portions, components, points of reference, operations and/or functions as described herein, and likewise may not necessarily limit embodiments of the described subject matter to any particular configuration or orientation.

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular is also to be construed to relate to the plural and vice-versa without limiting the scope of the disclosure to the exact number or type of such elements unless set forth explicitly in the appended claims.

Embodiments of the disclosed subject matter may be directed to and involve a control system, an apparatus and a method of controlling operations of a milling machine, such as a cold planer. More particularly, embodiments of the disclosed subject matter may control various operations of the milling machine automatically from transition of operation of the milling machine from a milling mode to a standby mode and vice versa.

Figure 1:
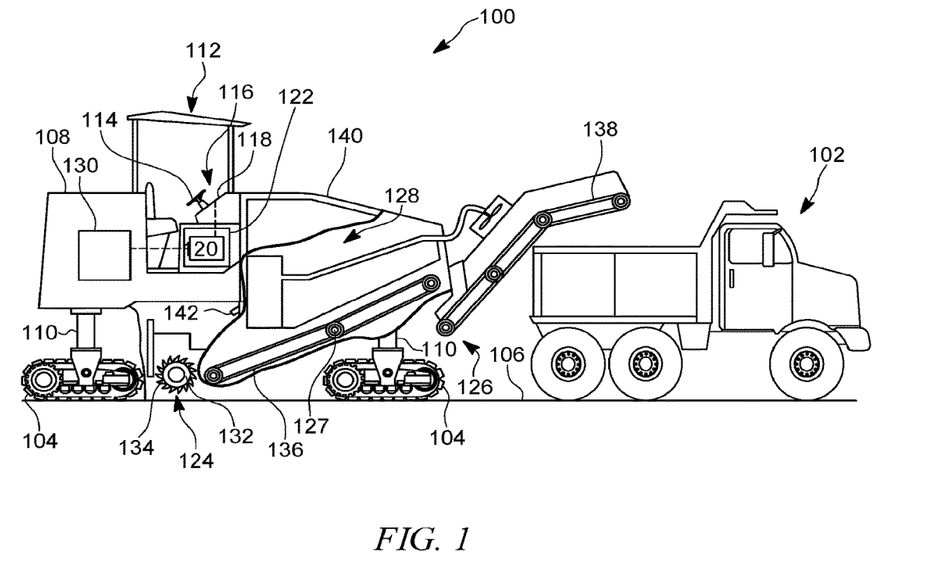
FIG. 1 is a diagrammatic representation of a side view of a cold planer according to one or more embodiments of the present disclosure.

FIG. 1 is diagrammatic representation of a side view of a cold planer 100 according to one or more embodiments of the present disclosure. The "cold planer" may be defined as any machine used to break up and remove layers of hardened material from a road surface. The cold planer 100 may be interchangeably referred to herein as "a cold planer machine," "a milling machine," or "a machine."

The cold planer 100 may include a plurality of movable engagement members 104 to propel the cold planer 100 forward and backward on a road surface 106. The plurality of movable engagement members 104 may be connected to a frame 108 of the cold planer 100 through a plurality of hydraulic legs 110. Although the plurality of movable engagement members 104 of the cold planer 100 are illustrated in FIG. 1 as including tracks, the plurality of movable engagement members 104 may additionally or alternatively include a set or sets of wheels.

The frame 108 of the cold planer 100 may be adapted to support an operator area 112. The operator area 112 may include a steering command element 114 and a control panel 116. Although, the steering command element 114 is shown to include a steering wheel in FIG. 1, other steering devices, such as joysticks, buttons, and/or levers may be implemented as the steering command element 114.

The control panel 116 may include a user interface unit 118, which may be configured to receive input(s) from an operator of the cold planer 100 to operate the cold planer 100. The user interface unit 118 may be in communication with a controller or circuitry 120 (hereinafter referred to as "controller 120") of a control system 122 of the cold planer 100. The controller 120 may be configured to communicate control signal(s) to one or more system(s) of the cold planer 100 to control the operation(s) of the one or more system(s) based on input(s) provided, for example, by the operator at the user interface unit 118. The one or more system(s) of the cold planer 100 may include, but are not limited to, the plurality of movable engagement members 104, a milling system 124, a conveyor system 126, a ventilation system 128, and an engine 130.

The engine 130 may supply power to the plurality of movable engagement members 104 to propel the cold planer 100 either forward or backward. In one embodiment, such propulsion may be accomplished by driving a hydraulic pump (not illustrated) with an output of the engine 130, which, in turn, may supply high-pressure hydraulic fluid to individual motors (not shown) associated with the plurality of movable engagement members 104. The engine 130 may also supply power to the milling system 124 to rotatably drive a milling drum 132 of the milling system 124 to carry out a milling operation on the road surface 106.

The milling system 124 may be supported on the frame 108 of the cold planer 100. The milling system 124 may facilitate milling of the road surface 106 using milling drum 132, which may include a plurality of cutting tools 134, for instance, arranged circumferentially around the milling drum 132.

A cutting plane of the cold planer 100 may be tangential to a bottom of the milling system 124 and parallel to a direction of travel of the cold planer 100. Further, the milling drum 132 of the milling system 124 may rotate, upon receiving power from the engine 130. Accordingly, the plurality of cutting tools 134 of the milling system 124 may be adapted to come in repeated contact with the road surface 106 to break up one or more layers of material from the road surface 106. The hydraulic legs 110 may act as telescopic actuators configured to raise and lower the milling system 124 relative to the plurality of movable engagement members 104 to control a depth of cut by the milling system 124. Additionally or alternatively, the milling drum 132 may be raised or lowered with or independent of the hydraulic legs 110 to control the depth of cut by the milling system 124. The material resulting from the removal of the one or more layers of the road surface 106 may be discharged from the cold planer 100 to a deposit site remote or distinct from the cold planer 100, such as a dump truck 102 illustrated in FIG. 1. The resultant material may be discharged away from the cold planer, toward the deposit site, using the conveyor system 126 of the cold planer 100.

Thus, the conveyor system 126 may be provided to collect materials or particles, such as excavated asphalt, produced during breakup of the road surface 106 by the milling system 124, and transport and discharge such materials from the cold planer 100. The conveyor system 126 may include at least one conveyor belt and at least one drive motor 127, where the at least one conveyor belt may be configured to transport material of the road surface 106 resulting from the milling operation of the milling system 124 toward a discharge location of the cold planer 100 and toward the deposit location distinct from the cold planer 100, such as dump truck 102. In one or more embodiments, the conveyor system 126 may include a lower conveyor belt 136 and an upper conveyor belt 138 positioned adjacent to the lower conveyor belt 136. The lower conveyor belt 136 may collect material from the milling operation and transport the material to the upper conveyor belt 138, while the upper conveyor belt 138 may transport the material to the discharge location at a far end of the upper conveyor belt 138, for instance. The material may be output from the cold planer 100 by the upper conveyor belt 138 at the discharge location to the deposit location, such as dump truck 102. In various embodiments, the upper conveyor belt 138 may be movable relative to the lower conveyor belt 136 in a vertical direction and/or a horizontal direction so as to adjust the conveyor system 126 with respect to the discharge location, for instance. The dump truck 102 may be, for instance, a highway haul truck, an off-highway articulated or non-articulated truck, or any other type of material transport vehicle.

The cold planer 100 may further include a water tank 140 and the ventilation system 128 supported on the frame 108. The water tank 140 may be positioned under a hood (not shown) of the cold planer 100 and proximal to the milling system 124 and the conveyor system 126. The water tank 140 may be in communication with at least one water nozzle 142 to selectively dispense water stored in the water tank 140 toward the milling drum 132 and the plurality of cutting tools 134 of the milling system 124, for instance, when the milling drum 132 is being rotationally driven. The ventilation system 128 may be configured to provide ventilation for byproducts of the milling operation, such as dust, small particles, and fumes.

The control panel 116, which may be interpreted as part of the control system 122, may be configured to control operation of the cold planer 100. Generally speaking, the control panel 116 may provide an operator control interface to receive one or more inputs from the operator to control operation or operations of the cold planer 100. Further, the control panel 116 may provide feedback to the operator via a display and/or visible settings, for instance.

Figure 2:
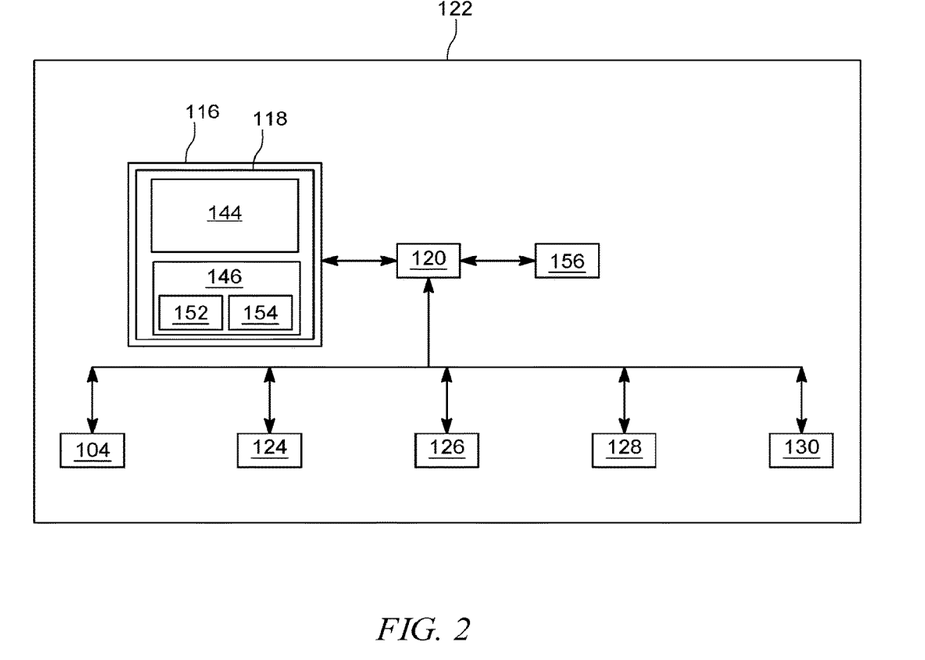
FIG. 2 is a block diagram of a control system for controlling operations of a cold planer according to one or more embodiments of the present disclosure.

Referring to FIG. 2, which illustrates a block diagram of the control system 122 for controlling operations of the cold planer 100 according to one or more embodiments, the control panel 116, which may include the user interface unit 118, may be in communication with the controller 120 of the control system 122 via a wired and/or wireless communication medium. Further, the user interface unit 118 may be configured to receive input(s) from the operator of the cold planer 100 to control operations of the cold planer 100, such as a first predetermined sequence of operations of the cold planer to transition operation of the cold planer 100 from the milling mode to the standby mode and/or a second predetermined sequence of operations of the cold planer to transition operation of the cold planer 100 from the standby mode to the milling mode.

The controller 120 may be configured to control operations of the one or more system(s) of the cold planer 100 including, but not limited to, the plurality of movable engagement members 104, the conveyor system 126, the milling system 124, the ventilation system 128, and the engine 130, based on an input or inputs by the operator using the user interface unit 118. Further, the operator of the cold planer 100 may set or reset parameters of the one or more system(s) for controlling the operations of the cold planer 100 using the user interface unit 118.

For example, the user interface unit 118 may include a first operator control interface 144 and a second operator control interface 146. In one or more embodiments of the disclosed subject matter, the first operator control interface 144 may be a button, for instance, such as a standby/milling button. In an example, the button may be a mechanical switch on the control panel 116 or a touch screen icon on a display of the control panel 116. The first operator control interface 144 may be activated (e.g., depressed) to initiate transition of the cold planer 100 from the milling mode to the standby mode or vice versa, depending upon which mode the cold planer 100 is in when the first operator control interface 144 is activated and, optionally, other operational characteristics of the cold planer 100.

The term "milling mode" as used herein may refer to a mode of operation of the cold planer 100 in which the milling system 124 is operating to remove a layer or layers of the road surface 106 (though milling may or may not occur depending upon whether any layers remain to mill), or a mode in which the cold planer 100 is ready to perform the milling operation. During the milling mode, engine 130 may be configured to run at "high idle." The term "high idle" may refer to an idle state of the engine 130 having a revolutions per minute (RPM) value greater than an idle state of the engine 130 corresponding to "low idle." The term "standby mode" as used herein may refer to a mode of operation of the cold planer 100 in which the milling system 124 is not in operation to remove a layer or layers of the road surface 106, or a mode in which the cold planer 100 is not ready to perform the milling operation. Optionally, the milling system 124 may rotate the milling drum 132 in the standby mode. During transition to the standby mode from the milling mode, the engine 130 may be controlled to run at "low idle," the conveyor system 126 and the ventilation system 128 may be controlled to run for a first preset time period and a second preset time period, respectively, before turning off, and the plurality of movable engagement members 104 may be stopped from propelling the cold planer 100 (if the cold planer 100 is moving), not necessarily in the foregoing order.

The second operator control interface 146 may include a conveyor delay interface 152 and/or a ventilation mode interface 154. The operator, by way of the second operator control interface 146, may view a current setting of the conveyor delay interface 152 and a current setting of the ventilation mode interface 154.

Optionally, the conveyor delay interface 152 may be configured to receive an input from the operator to set and/or modify (i.e., reset) a conveyor delay time period. In an example, the conveyor delay time period may be a time period for which the conveyor system 126 drives at least one conveyor (e.g., conveyor belts, such as lower conveyor belt 136 and upper conveyor belt 138) after initiation of the first predetermined sequence of operations to transition operation of the cold planer 100 from the milling mode to the standby mode. For example, the time period may be in the range of 1-30 seconds (e.g., 7 seconds), though the foregoing range is merely an example and not intended to be limiting. Further, generally speaking, the time period to which the conveyor delay time period is set may be referred to herein as a second preset condition of the conveyor system 126.

The ventilation mode interface 154 may be configured to receive an input from the operator to set a mode of the ventilation system 128 to either manual mode or auto mode, for instance. Generally speaking, the mode to which the ventilation system 128 is set may be referred to as a first preset condition of the ventilation system 128, and may be indicative of whether or not the ventilation system 128 is to turn off automatically as part of the first predetermined sequence of operations to transition operation of the cold planer 100 from the milling mode to the standby mode. For example, when the ventilation system 128 is set using the ventilation mode interface 154 to the auto mode, the ventilation system 128 may turn off automatically as part of the first predetermined sequence of operations to transition operation of the cold planer 100 from the milling mode to the standby mode. When the ventilation system 128 is set using the ventilation mode interface 154 to the manual mode, the ventilation system 128 may not turn off automatically as part of the first predetermined sequence of operations to transition operation of the cold planer 100 from the milling mode to the standby mode. Rather, the operator may manually turn off the ventilation system 128.

The control system 122 may include memory 156, and the memory 156 may store data corresponding to the conveyor delay time period set using the conveyor delay interface 152 and/or data corresponding to the mode of the ventilation system 128 set using the ventilation mode interface 154.

The control system 122 may include the controller 120 and the memory 156. The controller 120 may be configured to receive the input(s) from the user interface unit 118 to control operations of the cold planer 100. In an example, the controller 120 may be a separate control unit or may be part of a central control unit operable to control additional functions of the cold planer 100. The controller 120 may further be configured to be in communication with the memory 156 to store data based on input(s) by the operator using the user interface unit 118, for instance. The controller 120 may also be configured to be in communication with various systems of the cold planer 100 including, but not limited to, the plurality of movable engagement members 104, the milling system 124, the conveyor system 126, the ventilation system 128, and the engine 130. The user interface unit 118 having the first operator control interface 144 and the second operator control interface 146 may be in communication with the controller 120 to control the operations of the systems of the cold planer 100 via a wired and/or wireless communication medium. The cold planer 100 may be configured to be operated in various modes, including, but not limited to, the standby mode, the milling mode, and an "OFF" mode.

The controller 120 in communication with the plurality of movable engagement members 104 may be configured to control movement of the plurality of movable engagement members 104 based on the input(s) by the operator using the user interface unit 118. For example, if the operator has initiated transition from the milling mode to the standby mode for the cold planer 100 using the first operator control interface 144, for instance, then the controller 120 may provide control signals to the plurality of movable engagement members 104 to reduce speed or to stop movement of the plurality of movable engagement members 104. As another example, if the operator has initiated transition from the standby mode to the milling mode for the cold planer 100 using the first operator control interface 144, for instance, the controller 120 may send control signals for the plurality of movable engagement members 104 to resume a speed at a time of initiating transition to the standby mode from the milling mode. Additionally or alternatively, the controller 120 in communication with the engine 130 may be configured to control transition to a state of the engine 130, such as to an idle state of the engine 130, based on an operational mode of the cold planer 100 selected by the operator. Such selection may be provided by the operator via an input to the first operator control interface 144.

Optionally, in one or more embodiments of the disclosed subject matter, selection of the operational mode of the cold planer 100 may be based on a single operator request at the first operator control interface 144. The single operator request may be a single operator input to the first operator control interface 144, such as activation of a single standby/milling button of the first operator control interface 144. Alternatively, the single operator request may be a multi-stage input. For example, the single operator request may be operator activation of the standby/milling button and operator activation of a joystick interlock, for instance, in either order.

Further, selection of the operational mode of the cold planer 100 using the single operator request at the first operator control interface 144 may initiate the first predetermined sequence of operations to transition the cold planer 100 from the milling mode to the standby mode (if the cold planer 100 is in the milling mode upon receipt of the single operator request). Likewise, selection of the operational mode of the cold planer 100 using the single operator request at the first operator control interface 144 may initiate the second predetermined sequence of operations to transition the cold planer 100 from the standby mode to the milling mode (if the cold planer 100 is in the standby mode upon receipt of the single operator request). Based on the operation mode of the cold planer 100 and the single operator request, the controller 120 may generate a control signal or signals to initiate either the first predetermined sequence of the operations or the second predetermined sequence of operations. In one or more embodiments of the disclosed subject matter, the second predetermined sequence of operations may be in reverse order relative to the first predetermined sequence of operations.

The first predetermined sequence of the operations may be initiated for transition of operation of the cold planer 100 from the milling mode to the standby mode, as noted above. The first predetermined sequence of operations may include, but is not limited to, the milling drum 132 continuing to rotate or be rotationally driven, controlling the operation of the plurality of movable engagement members 104, reducing speed of the engine 130 to low idle from high idle, turning off the conveyor system 126 (or a portion thereof, such as at least one conveyor), and turning off the ventilation system 128. The first predetermined sequence of operations may be as set forth above, or according to some other order. Additionally, in one or more embodiments, some of the foregoing operations may be performed at the same time in the first predetermined sequence of operations, such as turning off the conveyor system 126 and turning off the ventilation system 128. Optionally, the ventilation system 128 may not be turned off as part of the first predetermined sequence of operations, for instance, if the ventilation mode of the cold planer 100 is in the manual mode. Of course, the operator may still manually turn off the ventilation system 128 before, during, or after the first predetermined sequence of operations.

Generally speaking, the conveyor system 126 may be configured to operate for the first preset time period to dispose of remaining particles on the conveyor system 126, and the ventilation system 128 may be configured to operate for the second preset time period to clear the cold planer 100 of dust and fumes.

The ventilation system 128 may be turned off based on a ventilation mode of the cold planer 100, which may be set by the operator using the ventilation mode interface 154. Further data corresponding to the ventilation mode set by the operator may be stored in the memory 156 for retrieval by the controller 120 upon initiation of the first predetermined sequence of operations. For example, if the ventilation mode of the cold planer 100 is set to automatic mode, the ventilation system 128 may be turned off as part of the first predetermined sequence of operations. Optionally, the ventilation system 128 may be turned off at the end of either a second preset time period, or upon completion of another operation of the first predetermined sequence of operations, such as stopping movement of the cold planer 100 by controlling the plurality of movable engagement members 104.

Controlling operation of the plurality of movable engagement members 104 may result in stopping propulsion of the cold planer 100 if the cold planer 100 is moving.

The conveyor system 126 may be turned off upon reaching a first preset time period after initiation of the first predetermined sequence of operations. Such first preset time period may be set by the operator using the conveyor delay interface 152. The conveyor delay set by the operator using the conveyor delay interface 152 may be a time period at which the drive motor 127 of the conveyor system 126 stops after initiation of the first predetermined sequence of the operations to transition operation of the cold planer 100 from the milling mode to the standby mode. The conveyor delay may also be a time period after initiation of the first predetermined sequence of operations at which to stop a portion of the conveyor system 126, such as the drive motor 127 or at least one conveyor. The time period of the conveyor delay may be stored as data in the memory 156 and retrieved by the controller 120 upon initiation of the first predetermined sequence of operations.

In one or more embodiments, the operator may set or reset a speed of the conveyor system 126 based on desired requirements. For example, the conveyor system 126 may be made to delay or speed up as part of the transition from the milling mode to the standby mode (e.g., to more quickly clear the conveyor system of milled material). The "new" speed of the conveyor system 126 for the transfer of operation from the milling mode to the standby mode or vice versa may be set by the operator using the second operator control interface 146, for instance. Further, data corresponding to the speed of the conveyor system 126 may be stored in the memory 156 for retrieval by the controller 120 upon initiation of the first predetermined sequence of operations.

The second predetermined sequence of the operations may be initiated for transition of operation of the cold planer 100 from the standby mode to the milling mode (if the cold planer 100 is in the standby mode). The operator may provide an input to the first operator control interface 144 to command transition from the standby mode to the milling mode. Such transition may be a return to the milling mode, or, put another way, the milling mode may be resumed.

The input to the first operator control interface 144 to transition from the standby mode to the milling mode may be the same input to the first operator control interface 144 as the input to transition from the milling mode to the standby mode. For example, the operator may press the standby/milling button to transition from the standby mode to the milling mode and vice versa. Once the operator provides the input to the first operator control interface 144 to command transition from the standby mode to the milling mode, a signal from the first operator control interface 144 (or the control panel 116) may be communicated to the controller 120 to initiate the second predetermined sequence of operations of the cold planer 100. Based on the signal from the first operator control interface 144 (or the underlying control panel 116), the controller 120 may generate a control signal or signals to initiate the second predetermined sequence of the operations.

The second predetermined sequence of operations may include, but is not limited to, the milling drum 132 continuing to rotate or be rotationally driven, setting the speed of the engine 130 to high idle, turning on the ventilation system 128, turning on the conveyor system 126 or a portion thereof (e.g., at least one conveyor), and controlling the operation of the plurality of movable engagement members 104 either to start propulsion of the cold planer 100 if the plurality of movable engagement members 104 were enabled upon initiation of the first predetermined sequence of operations, or to leave disabled the plurality of movable engagement members 104 if the plurality of movable engagement members 104 were disabled upon initiation of the first predetermined sequence of operations.

The second predetermined sequence of operations may be as set forth above, or according to some other order. In one or more embodiments, the second predetermined sequence of operations may be in reverse order relative to the first predetermined sequence of operations. Further, in one or more embodiments, some of the foregoing operations may be performed at the same time in the second predetermined sequence of operations, such as turning on the conveyor system 126 and turning on the ventilation system 128. Optionally, the ventilation system 128 may not be turned on as part of the second predetermined sequence of operations, for instance, if the ventilation mode of the cold planer 100 is manual mode and the ventilation system 128 is off, or if the ventilation system 128 was never turned off in the first place as part of the first predetermined sequence of operations. Of course, the operator may still manually turn on the ventilation system 128 before, during, or after the second predetermined sequence of operations if the ventilation mode is set to the manual mode.

INDUSTRIAL APPLICABILITY

The present disclosure relates to the control system 122 for the cold planer 100 or another milling machine. The cold planer 100 may include the frame 108 including the operator area 112. The operator area 112 may have the control panel 116 with the first operator control interface 144 and the second operator control interface 146. The cold planer 100 may further include the plurality of movable engagement members 104 connected to the frame 108 of the cold planer 100. The plurality of movable engagement members 104 may be configured to engage the underlying surface of the cold planer 100 to propel the cold planer 100 forward and backward along the road surface 106. The cold planer 100 may further include the milling system 124 supported by the frame 108. The milling system 124 may include the milling drum 132 and the plurality of cutting tools 134, which may be disposed circumferentially around the milling drum 132. The milling system 124 may be configured to conduct the milling operation to mill the road surface 106.

The cold planer 100 may receive power from the engine 130 and supply power to the plurality of movable engagement members 104 and the milling system 124 during the operation of the cold planer 100. The cold planer 100 may also include the conveyor system 126 including at least one conveyor and the at least one drive motor 127, where the conveyor system 126 may be configured to receive particles of road material resulting from the milling operation of the milling system 124 and transport the particles of the road material toward the discharge location of the cold planer 100 for discharge to the deposit location, which may be distinct or remote from the cold planer 100. The cold planer 100 may further include the ventilation system 128 configured to provide ventilation for byproducts of the milling operation of the milling system 124, such as dust.

The cold planer 100 may further include the controller 120, which may be implemented in or as circuitry. The controller 120 may be configured to receive, when the cold planer 100 is in the milling mode, a control signal from the first operator control interface 144 to initiate the first predetermined sequence of operations to transition operation of the cold planer 100 from the milling mode to the standby mode. Further, the controller 120 may be configured to, responsive to the control signal received in the milling mode, control transition of operation of the cold planer 100 from the milling mode to the standby mode according to the first predetermined sequence of operations based on the first preset condition of the ventilation system 128 and the second preset condition of the conveyor system 126, which may be input by the second operator control interface 146 and stored in the memory 156. The controller 120 may be further configured to receive, when the cold planer 100 is in the standby mode, a control signal from the first operator control interface 144, which may be the same control signal to initiate the first predetermined sequence of operations, to initiate the second predetermined sequence of operations to transition operation of the cold planer 100 from the standby mode to the milling mode. Optionally, the second predetermined sequence of operations may be in reverse order relative to the first predetermined sequence of operations. The controller 120 may be further configured to, responsive to the control signal received in the standby mode, control the transition of operation of the cold planer 100 from the standby mode to the milling mode according to the second predetermined sequence of operations.

The first preset condition of the ventilation system 128 may be whether the ventilation system 128 is to turn off automatically as part of the first predetermined sequence of operations to transition operation of the cold planer 100 from the milling mode to the standby mode. The second preset condition of the conveyor system 126 may be a time period, set by the operator via the second operator control interface 146, for which the conveyor system 126 drives the at least one conveyor belt after initiation of the first predetermined sequence of operations to transition operation of the cold planer 100 from the milling mode to the standby mode. The time period may be sufficiently long so as to discharge any remaining particles on the conveyor system 126 from the discharge location so the conveyor system 126 is free or substantially free of particles.

Figure 3:
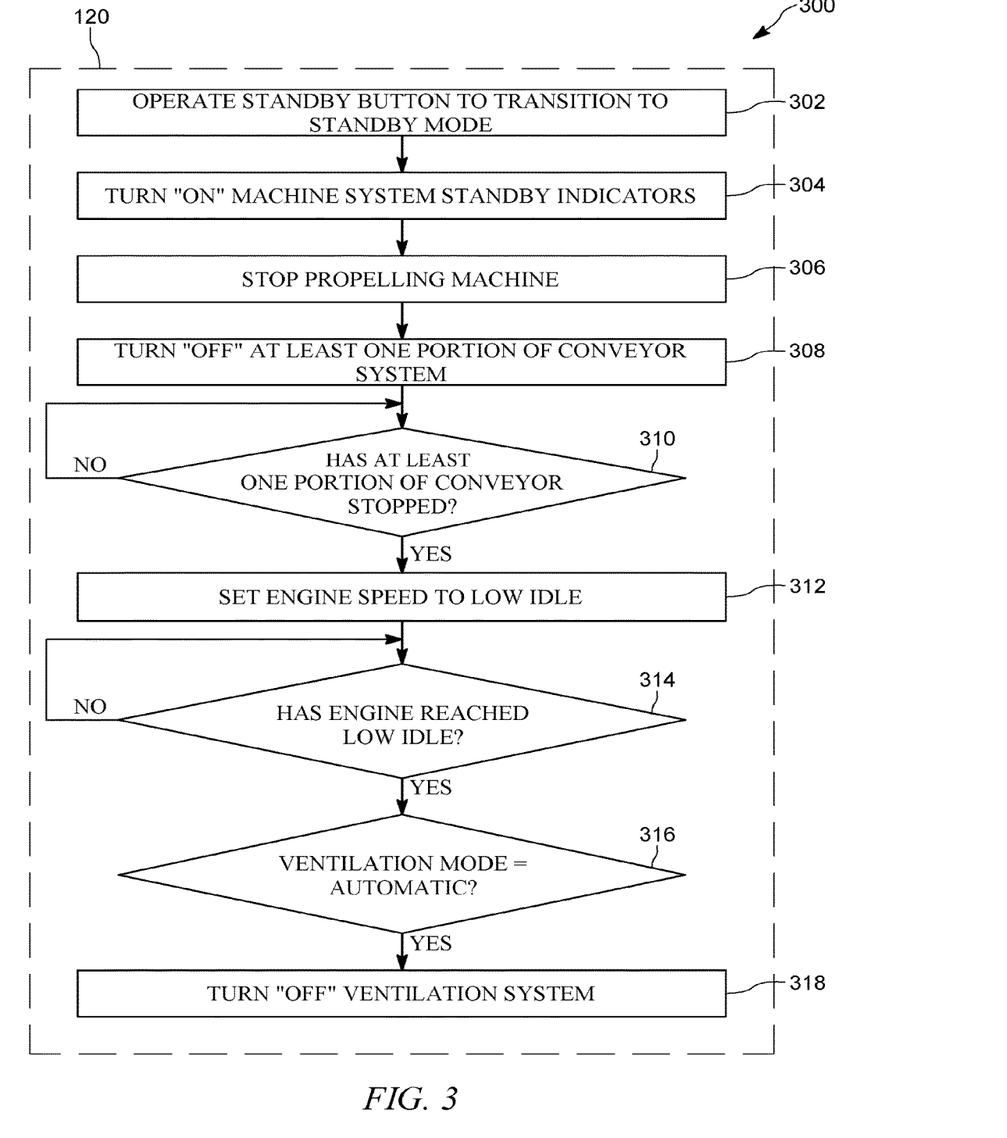
FIG. 3 is a flowchart of a method of controlling operations of a milling machine to transition operation from a milling mode to a standby mode, according to one or more embodiments of the present disclosure.

FIG. 3 illustrates a flowchart of a method 300 of controlling operations of a milling machine, such as the milling 100, to transition operation of the milling machine from the milling mode to the standby mode, according to one or more embodiments of the present disclosure. Some or all of the blocks of the method 300 may constitute a first predetermined sequence of operations to transition operation of the milling machine 100 from the milling mode to the standby mode. A controller, such as controller 120, which may be implemented in or as circuitry, may be configured to perform some or all of the operations of method 300.

If the milling machine 100 is in the milling mode, the operator of the milling machine 100 may decide to put the milling machine 100 in the standby mode, for instance, when the dump truck 102 at the deposit location is loaded or substantially loaded with material from the milling operation of the milling machine 100. The operator may initiate transition of the milling machine 100 to the standby mode by providing an input to the first operator control interface 144, which may be in the form of activating the standby/milling button, for instance, of the control panel 116 of the milling machine 100 at block 302. The controller 120 may receive a signal from the first operator control interface 144 (or control panel 116) and initiate the transition of operation of the milling machine 100 from the milling mode to the standby mode responsive to receiving the signal from the first operator control interface 144.

As an optional part of the first predetermined sequence of operations to transition from the milling mode to the standby mode, at block 304 the controller 120, for instance, may turn on system standby indicators of the milling machine 100, which may be provided on the control panel 116.

If the milling machine 100 is moving, at block 306, one or more control signals may be output, for instance, by the controller 120, to control the plurality of movable engagement members 104 to stop propelling the milling machine 100. Of course, in one or more embodiments, the milling machine 100 may not be moving, so such control signal or signals to stop the plurality of movable engagement members 104 from propelling the milling machine 100 may not be output. Optionally, the controller 120, for instance, may determine that the milling machine 100 is not moving, or may otherwise determine that a predetermined amount of time has passed since sending the one or more control signals to control to the plurality of movable engagement members 104 to stop propelling the milling machine 100.

At block 308, the controller 120, for instance, may turn off at least one portion of the conveyor system 126. Such control may include determining whether the second preset condition regarding the conveyor system 126 has been met after initiation of the transition of operation of the milling machine 100 to the standby mode. As an example, the second preset condition may be the conveyor delay in the form of the time period after the initiation of the transition to the standby mode for which the conveyor system 126 drives at least one conveyor of the conveyor system 126, or the time period after the initiation of the transition to the standby mode at which at least one conveyor of the conveyor system 126 is controlled to stop moving. The controller 120 may send a control signal or signals to turn off the at least one portion of the conveyor system 126, such as the at least one driver motor 127 and/or at least one conveyor (e.g., lower conveyor belt 136 and/or upper conveyor belt 138) when the second preset condition is met. Optionally, in the case of multiple conveyors, such as illustrated in FIG. 1, the conveyors may be turned off in sequence, starting from closest to the milling drum 132, for instance, when the second preset condition is met.

Optionally, at block 310, the controller 120, for instance, may check whether the at least one portion of the conveyor system 126 has been turned off (e.g., has stopped moving) when the second preset condition is met. If the controller 120 determines that the at least one portion of the conveyor system 126 has not stopped when the second preset condition is met, the controller 120 may continue to monitor the status of the at least one portion of the conveyor system 126 until the controller 120 determines that the at least one portion of the conveyor system 126 has stopped, whereupon the method 300 may proceed to block 312.

At block 312, the controller 120, for instance, may output a control signal or signals to set the speed of engine 130 to low idle from high idle, for instance.

At optional block 314, the controller 120, for instance, may determine whether the engine 130 has reached the low idle state. If the controller 120 determines that the speed of the engine 130 has not reached low idle, the controller 120 may continue to monitor the idle state of the engine 130 until the controller determines that the speed of the engine 130 has reached low idle, whereupon the method 300 may proceed to block 316.

At block 316, the method 300 may include determining whether a ventilation mode of the ventilation system 128 is set to automatic mode or manual mode. The controller 120 may make such determination. If the ventilation mode is set to automatic mode, the method may proceed to block 318. If the ventilation mode is set to manual mode, the operational state of the ventilation system 128 may not change during the first predetermined sequence of operations to transition from the milling mode to the standby mode as set forth in method 300, unless, of course, the operator of the milling machine 100 manually changes the operational state of the ventilation system 128 (e.g., turns off a fan of the ventilation system 128).

Figure 4:
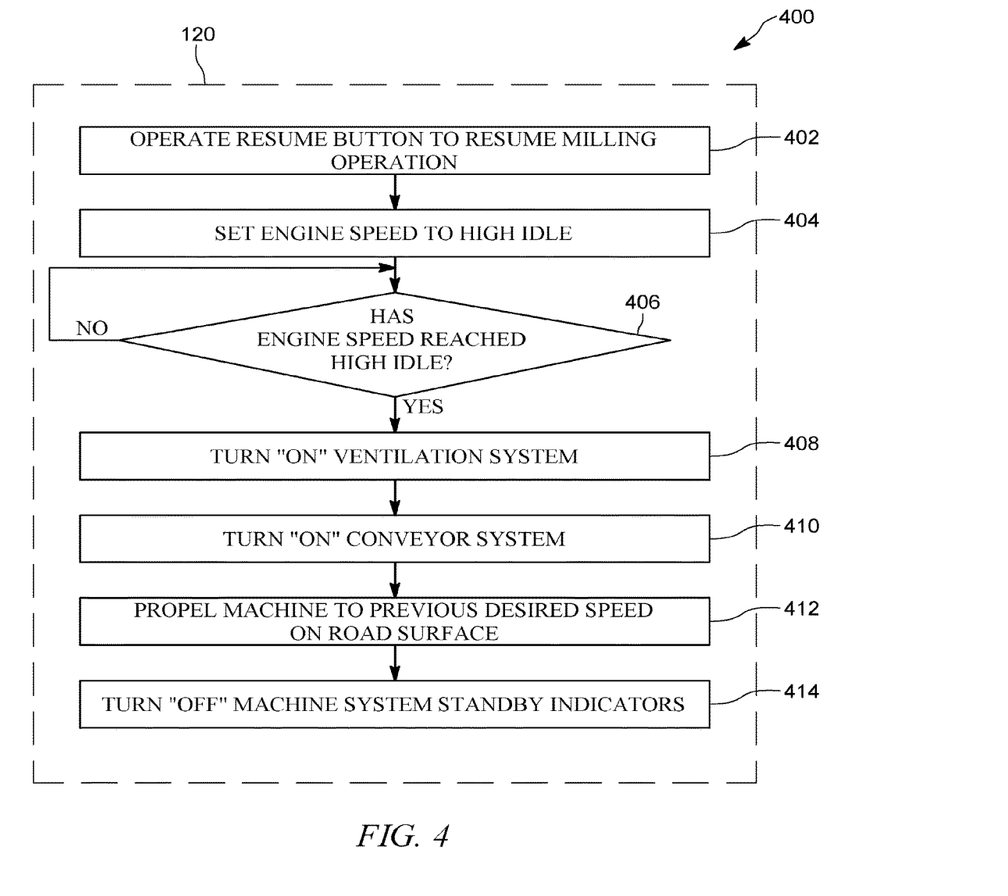
FIG. 4 is a flowchart of a method of controlling operations of a cold planer to transition operation from the milling mode to the standby mode, according to one or more embodiments of the present disclosure.

FIG. 4 illustrates a flowchart of a method 400 of controlling operation of a milling machine, such as milling machine 100, to transition from the standby mode to the milling mode, according to one or more embodiments of the present disclosure. Some or all of the blocks of the method 400 may constitute a second predetermined sequence of operations to transition operation of the milling machine 100 from the standby mode to the milling mode. Further, in one or more embodiments of the disclosed subject matter, at least some of the operations of method 400 may be performed in reverse order relative to their order of the method 300 of FIG. 3. Additionally or alternatively, the method 400 may return at least one, some, or all of the operational states of the milling machine 100 changed for method 300 of FIG. 3 to their operational states at a time of initiating the method 300. A controller, such as controller 120, which may be implemented in or as circuitry, may be configured to perform some or all of the operations of method 400.

If the milling machine 100 is in the standby mode, the operator of the milling machine 100 may decide to put the milling machine 100 in the milling mode, for instance, when the dump truck 102 at the deposit location can receive material from the conveyor system 126. The operator may initiate the transition of the milling machine 100 to the milling mode by providing an input to the first operator control interface 144, which may be in the form of activating the standby/milling button, for instance, of the control panel 116 at block 402. The controller 120 may receive a signal from the first operator control interface 144 (or control panel 116) and initiate transition of operation of the milling machine 100 from the standby mode to the milling mode responsive to receiving the signal from the first operator control interface 144 (or control panel 116).

At block 404, the controller 120, for instance, may set the speed of the engine 130 to high idle from low idle, for instance.

Optionally, at block 406, the controller 120, for instance, may determine whether the speed of the engine 130 has reached the high idle state. If the controller 120 determines that the speed of the engine 130 has not reached high idle, the controller 120 may continue to monitor the idle state of the engine 130 until the controller 120 determines that the speed of the engine 130 has reached high idle, whereupon the method 400 may proceed to block 408.

At block 408, the controller 120, for instance, may determine whether the ventilation mode is set to automatic mode or manual mode, and also whether the ventilation system 128 is currently in an "ON" state. If the ventilation system 128 is currently in an "OFF" state and the ventilation mode is set to automatic mode, block 408 may include turning on the ventilation system 128, for instance, responsive to a control signal or signals from the controller 120. Optionally, for the ventilation system 128 to be turned on at block 408 the additional condition of the ventilation system 128 being in an "ON" state just prior to initiation of the transition from the milling mode to the standby mode, for instance, as set forth in method 300 must be satisfied.

At block 410, the controller 120, for example, may determine whether the conveyor system 126 was in an "ON" state upon initiation of the transition from the milling mode to the standby mode, for instance, as set forth in method 300. If the controller 120 determines that the conveyor system 126 was "ON" just prior to the initiation of the transition from the milling mode to the standby mode, then the controller 120 may output a control signal or signals to the conveyor system 126 to turn on the conveyor system 126 (or at least one portion thereof, for instance, at least one portion thereof turned off as part of the transition from the milling mode to the standby mode).

At block 412, the controller 120, for instance, may determine whether the milling machine 100 was moving just prior to the initiation of the transition from the milling mode to the standby mode. If the milling machine 100 was moving just prior to the initiation of the transition from the milling mode to the standby mode, at block 412 the controller 120 may output a control signal or signals to control one or more of the plurality of movable engagement members 104 to cause the milling machine 100 to move. Optionally, block 412 may control one or more of the plurality of movable engagement members 104 to cause the milling machine 100 to move at a speed of movement just prior to initiation of the transition from the milling mode to the standby mode. If the milling machine 100 was not moving just prior to the initiation of the transition from the milling mode to the standby mode, the control process at block 412 may not control the one or more of the plurality of movable engagement members 104 to cause the milling machine 100 to move.

At block 414, optionally, the machine system standby indicators may be turned off if they were optionally turned on as part of the first predetermined sequence of operations to transition operation of the milling machine 100 from the milling mode to the standby mode.

Figure 5:
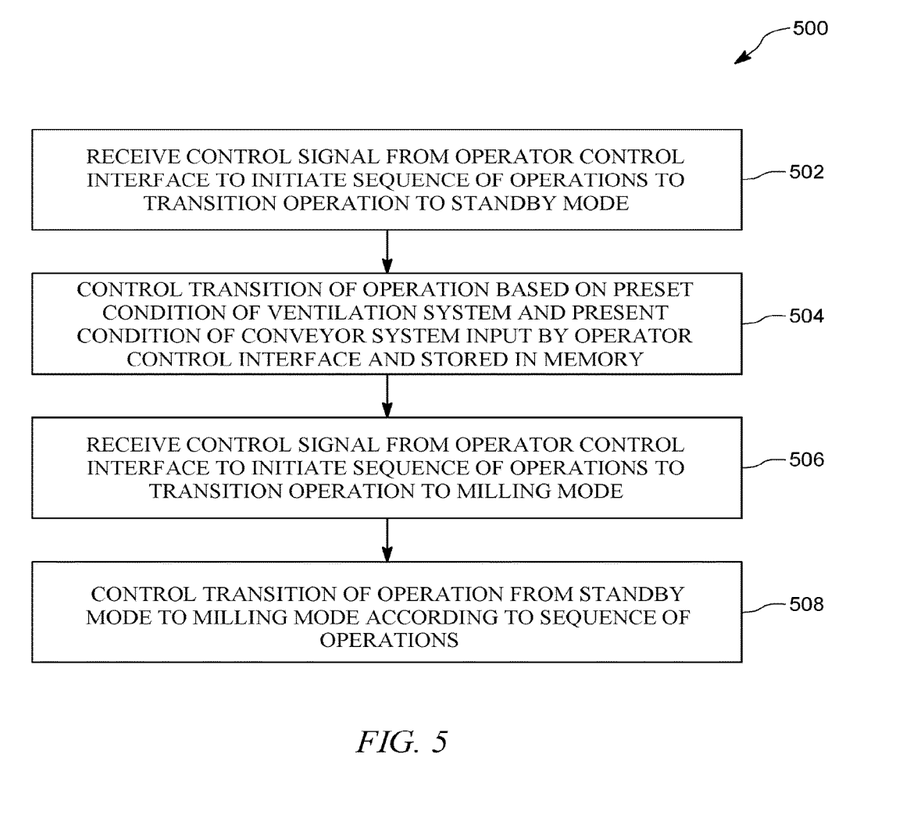
FIG. 5 is a flowchart of a method of controlling operations of a cold planer according to one or more embodiments of the present disclosure.

FIG. 5 illustrates a flowchart of a method 500 of controlling operations of a milling machine, such as the milling machine 100, according to an embodiment of the present disclosure. A controller, such as controller 120, which may be implemented in or as circuitry, may be configured to perform some or all of the operations of method 500.

At block 502, the controller 120 may receive a control signal from a user interface unit, such as user interface unit 118, to initiate the first predetermined sequence of operations to transition operation to the standby mode. At block 504, the controller 120 may control transition of operation of the milling machine 100 to the standby mode based on a first preset condition of a ventilation system, such as the ventilation system 128, and/or a second preset condition of a conveyor system, such as the conveyor system 126, which may be input using the user interface unit 118 and optionally stored in memory, such as the memory 156. At block 506, the controller 120 may receive the control signal from the user interface unit 118 to initiate the second predetermined sequence of operations to transition operation of the milling machine 100 to the milling mode. At block 508, the controller 120 may control the transition of operation from the standby mode to the milling mode according to the second predetermined sequence of operations.

Figure 6:
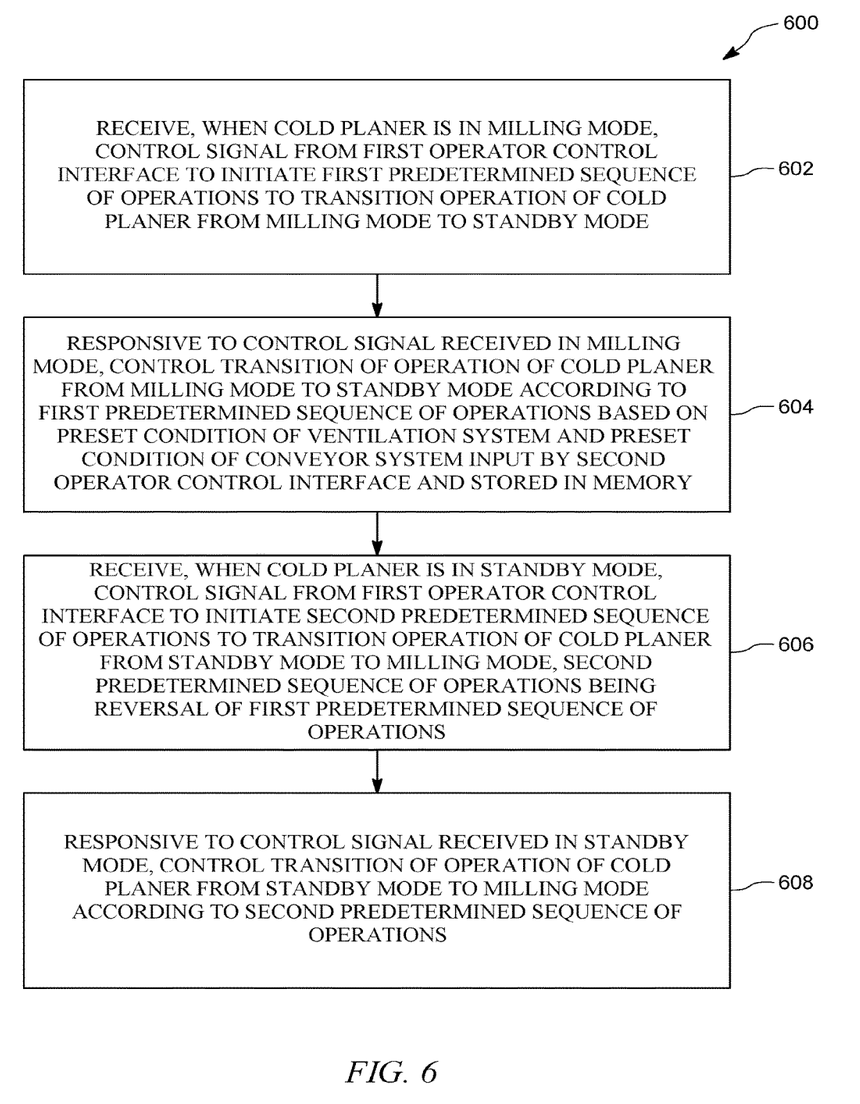
FIG. 6 is a flowchart of a method of controlling operations of a cold planer according to one or more embodiments of the present disclosure.

FIG. 6 illustrates a flowchart of a method 600 of controlling operations of a milling machine, such as the milling machine 100, according to another embodiment of the present disclosure. A controller, such as controller 120, which may be implemented in or as circuitry, may be configured to perform some or all of the operations of method 600.

At block 602, the controller 120, for instance, may be configured to receive, when the milling machine 100 is in the milling mode, a control signal from a first operator control interface, such as first operator control interface 144, to initiate the first predetermined sequence of operations to transition operation of the milling machine 100 from the milling mode to the standby mode.

At block 604, the controller 120, for instance, may be configured to control, responsive to the control signal received in the milling mode, the transition of operation of the milling machine 100 from the milling mode to the standby mode according to the first predetermined sequence of operations based on a first preset condition of a ventilation system, such as the ventilation system 128, and a second preset condition of a conveyor system, such as the conveyor system 126, which may be input using the second operator control interface 146 and stored in the memory 156.

At block 606, the controller 120, for instance, may be configured to receive, when the milling machine 100 is in the standby mode, the control signal from a first operator control interface, such as the first operator control interface 144, to initiate the second predetermined sequence of operations to transition operation of the milling machine 100 from the standby mode to the milling mode. Optionally, the second predetermined sequence of operations may be a reversal of the first predetermined sequence of operations.

At block 608, the controller 120, for instance, may be configured to control the transition of operation of the milling machine 100 from the standby mode to the milling mode according to the second predetermined sequence of operations responsive to the control signal received in the standby mode. The second predetermined sequence of operations may return each operational state of the milling machine 100 changed as part of the first predetermined sequence of operations to an operational state at a time of initiating the first predetermined sequence of operations.

The first predetermined sequence of operations may include, with the milling drum spinning or being rotationally driven, controlling the plurality of movable engagement members 104 to stop propulsion of the milling machine 100 if the milling machine 100 is moving, turning off the conveyor system 126 after a preset time period from initiating the first predetermined sequence of operations, reducing a speed of the engine 130 to low idle, and optionally turning off the ventilation system 128. Optionally, the ventilation system 128 may remain in an "ON" state for the first predetermined sequence of operations.

The second predetermined sequence of operations may include activating the plurality of movable engagement members 104 if the plurality of movable engagement members 104 were enabled at a time of initiation of the first predetermined sequence of operations, or leaving disabled the plurality of movable engagement members 104 if the plurality of movable engagement members 104 were disabled at the time of initiation of the first predetermined sequence of operations.

The controller 120 may be configured to receive a signal from the second operator control interface 146 corresponding to whether the operator has set the ventilation system 128 to turn off as part of the first predetermined sequence of operations to transition operation of the milling 100 from the milling mode to the standby mode, and to store in the memory 156 data corresponding whether the operator has set the ventilation system 128 to turn off as part of the first predetermined sequence of operations. The controller 120 may also be configured to receive a signal from the second operator control interface 146 corresponding to the time period set by the operator via the second operator control interface 146 for which the conveyor system 126 drives at least one conveyor belt after initiation of the first predetermined sequence of operations. The controller 120 may also be configured to control the water nozzle(s) 142 to turn off as part of the first predetermined sequence of operations to transition to the standby mode, and/or to turn on as part of the second predetermined sequence of operations to transition to the milling mode.

The methods 300, 400, 500, and 600 according to embodiments of the disclosed subject matter may save the operator time when transitioning between the milling mode and the standby mode and vice versa, and/or may mitigate the risk of forgetting to turn off and/or turn on components when transitioning to one of the standby mode and the milling mode. Also, the methods 300, 400, 500, and 600 may cut down on running time of systems of the milling machine 100 including, the conveyor system 126 and the ventilation system 128 between dump trucks 102. Further, the conveyor delay time, which may be set using the conveyor delay interface 152, may allow the conveyor system 126 to be emptied or substantially emptied prior to stopping the conveyor system 126.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

What is claimed is:

1. A cold planer comprising:
a frame including an operator area having a control panel with a first operator control interface and a second operator control interface;
a plurality of movable engagement members connected to the frame configured to engage an underlying surface to propel the cold planer forward and backward;
a milling system, supported by the frame, that includes a milling drum and a plurality of cutting tools disposed circumferentially around the milling drum, the milling system configured to conduct a milling operation to mill a road surface;
an engine configured to supply power to the plurality of movable engagement members and the milling system;
a conveyor system including at least one conveyor belt and at least one drive motor configured to collect particles of road material resulting from the milling operation of the milling system, transport the particles of road material toward a discharge location of the cold planer, and discharge the particles of road material from the discharge location toward a deposit location distinct from the cold planer;
a ventilation system configured to provide ventilation for byproducts of the milling operation of the milling system; and
a controller configured to:
receive, when the cold planer is in a milling mode, a control signal from the first operator control interface to initiate a first predetermined sequence of operations to transition operation of the cold planer from the milling mode to a standby mode,
responsive to the control signal received in the milling mode, control the transition of operation of the cold planer from the milling mode to the standby mode according to the first predetermined sequence of operations based on a first preset condition of the ventilation system and a second preset condition of the conveyor system input using the second operator control interface and stored in a memory,
receive, when the cold planer is in the standby mode, the control signal from the first operator control interface to initiate a second predetermined sequence of operations to transition operation of the cold planer from the standby mode to the milling mode, the second predetermined sequence of operations being in reverse order relative to the first predetermined sequence of operations, and
responsive to the control signal received in the standby mode, control the transition of operation of the cold planer from the standby mode to the milling mode according to the second predetermined sequence of operations,
wherein the first preset condition of the ventilation system is whether the ventilation system is to turn off automatically as part of the first predetermined sequence of operations to transition operation of the cold planer from the milling mode to the standby mode,
wherein the first preset condition is whether the ventilation system is set, via the second operator control interface, to an automatic mode or a manual mode, the controller determining whether the ventilation system is set to the automatic mode or the manual mode, and in response to determining that the ventilation system is in the manual mode, the controller does not change an operational state of the ventilation system during the first predetermined sequence of operations, and in response to determining that the ventilation system is in the automatic mode, the controller turns off automatically the ventilation system as part of the first predetermined sequence of operations to transition operation of the cold planer from the milling mode to the standby mode, and
wherein the second preset condition of the conveyor system is a time period, set by the operator using the second operator control interface, for which the conveyor system drives the at least one conveyor belt after initiation of the first predetermined sequence of operations to transition operation of the cold planer from the milling mode to the standby mode.

2. The cold planer of claim 1, wherein the first predetermined sequence of operations includes, with the milling drum being rotationally driven, controlling the plurality of movable engagement members to stop propulsion of the cold planer if the cold planer is moving, turning off the conveyor system at the end of the time period, reducing a speed of the engine to low idle, and turning off the ventilation system.

3. The cold planer of claim 1, wherein the first predetermined sequence of operations includes, with the milling drum being rotationally driven, controlling the movable engagement members to stop propulsion of the cold planer if the cold planer is moving, turning off the conveyor system at the end of the time period, and reducing a speed of the engine to low idle.

4. The cold planer of claim 1, wherein the second predetermined sequence of operations includes leaving disabled the movable engagement members if the movable engagement members were disabled upon initiation of the first predetermined sequence of operations.

5. The cold planer of claim 1, wherein the controller is configured to receive a signal from the second operator control interface corresponding to the time period set by the operator using the second operator control interface, for which the conveyor system drives the at least one conveyor belt after initiating the first predetermined sequence of operations.

6. A control system comprising:
a memory configured to store data corresponding to a ventilation mode set by an operator of a milling machine, and to store data corresponding to a conveyor delay amount set by the operator of the milling machine, the ventilation mode being indicative of whether a ventilation system of the milling machine is to turn off as part of a first predetermined sequence of operations to transition operation of the milling machine from a milling mode to a standby mode, and the conveyor delay amount being a time period after which a conveyor of the milling machine stops moving after initiation of the first predetermined sequence of operations to transition operation of the milling machine from the milling mode to the standby mode; and
a controller in communication with the memory, the controller configured to:
responsive to a first input at a control panel of the milling machine when the milling machine is in the milling mode, control transition of operation of the milling machine from the milling mode to the standby mode according to the first predetermined sequence of operations based on the data from the memory corresponding to the ventilation mode set by the operator and the data from the memory corresponding to the conveyor delay amount set by the operator, and
responsive to a second input at the control panel of the milling machine when the milling machine is in the standby mode, control transition of operation of the milling machine from the standby mode to the milling mode according to a second predetermined sequence of operations,
wherein the second predetermined sequence of operations returns each of a plurality of milling machine operational states changed as part of the first predetermined sequence of operations to an operational state at a time of initiating the first predetermined sequence of operations,
wherein the first predetermined sequence of operations includes the controller controlling a speed of an engine to a low idle state and determining whether the speed of the engine has reached the low idle state prior to determining whether the ventilation system is to turn off as part of the predetermined sequence of operations, and
wherein the second predetermined sequence of operations includes as first operations, the controller controlling the speed of the engine to a high idle state, from the low idle state, and determining whether the speed of the engine has reached the high idle state prior to performing remaining operations of the second predetermined sequence of operations.

7. The control system of claim 6, wherein the first predetermined sequence of operations includes, with a milling drum of the milling machine rotating, controlling a plurality of movable engagement members of the milling machine to stop propulsion of the milling machine if the milling machine is moving, turning off the conveyor at the end of the time period, reducing a speed of the engine of the milling machine to low idle, and turning off the ventilation system.

8. The control system of claim 6, wherein the first predetermined sequence of operations includes, with the milling drum of the milling machine rotating, controlling a plurality of movable engagement members of the milling machine to stop propulsion of the milling machine if the milling machine is moving, turning off the conveyor at the end of the time period, and reducing a speed of the engine of the milling machine to low idle.

9. The control system of claim 6, wherein the ventilation system remains in an "ON" state during the first predetermined sequence of operations and during the second predetermined sequence of operations.

10. The control system of claim 6, wherein the second predetermined sequence of operations includes leaving disabled a plurality of movable engagement members if the plurality of movable engagement members were disabled upon initiation of the first predetermined sequence of operations.

11. The control system of claim 6, wherein the controller is configured to receive a signal corresponding to whether the operator has set, at the control panel, the ventilation system to turn off as part of the first predetermined sequence of operations to transition operation of the milling machine from the milling mode to the standby mode.

12. The control system of claim 6, wherein the controller is configured to receive a signal corresponding to the conveyor delay amount set by the operator using the control panel.

13. The control system of claim 6, wherein the first predetermined sequence of operations includes turning off the ventilation system.

14. A computer-implemented method for controlling a cold planer, the computer-implemented method comprising:
receiving, when the cold planer is in a milling mode, a control signal from a first operator control interface to initiate a first predetermined sequence of operations to transition operation of the cold planer from the milling mode to a standby mode; and
controlling the transition of operation of the cold planer from the milling mode to the standby mode according to the first predetermined sequence of operations based on a first input corresponding to a first preset condition of a ventilation system and a second input corresponding to a second preset condition of a conveyor system at a second operator control interface and stored in a memory, in response to the control signal received in the milling mode, wherein the first preset condition is whether the ventilation system is set, via the second operator control interface, to an automatic mode or a manual mode, the method further comprising determining whether the ventilation system is set to the automatic mode or the manual mode, and in response to determining that the ventilation system is in the manual mode, not changing an operational state of the ventilation system during the first predetermined sequence of operations, in response to determining that the ventilation system is in the automatic mode, automatically turning off the ventilation system as part of the first predetermined sequence of operations to transition operation of the cold planer from the milling mode to the standby mode, wherein the first predetermined sequence of operations includes controlling a speed of an engine of the cold planer to a low idle state and determining whether the speed of the engine of the cold planer has reached the low idle state prior to determining whether the ventilation system is to turn off as part of the first predetermined sequence of operations, and wherein a second predetermined sequence of operations includes as first operations, setting the speed of the engine of the cold planer to a high idle state, from the low idle state, and determining whether the speed of the engine of the cold planer has reached the high idle state prior to performing remaining operations of the second predetermined sequence of operations.

15. The computer-implemented method of claim 14, further comprising:

receiving, when the cold planer is in the standby mode, the control signal from the first operator control interface to initiate a second predetermined sequence of operations to transition operation of the cold planer from the standby mode to the milling mode, the second predetermined sequence of operations being in reverse order relative to the first predetermined sequence of operations; and controlling the transition of operation of the cold planer from the standby mode to the milling mode according to the second predetermined sequence of operations in response to the control signal received in the standby mode.

16. The computer-implemented method of claim 14, wherein data corresponding to the automatic mode or the manual mode of the ventilation system set by an operator of the cold planer as the first input, and data corresponding to a conveyor delay amount set by the operator of the cold planer as the second input, are stored in the memory.

17. The computer-implemented method of claim 14, wherein the second preset condition of the conveyor system is a time period, set by the operator using the second operator control interface, for which the conveyor system drives at least one conveyor belt thereof after initiation of the first predetermined sequence of operations to transition operation of the cold planer from the milling mode to the standby mode.

18. The computer-implemented method of claim 14, wherein the second predetermined sequence of operations includes leaving disabled a plurality of movable engagement members if the plurality of movable engagement members were disabled upon initiation of the first predetermined sequence of operations.

* * * * *